United States Patent [19]
Chikaraishi et al.

[11] Patent Number: 5,796,014
[45] Date of Patent: Aug. 18, 1998

[54] TORQUE SENSOR

[75] Inventors: Kazuo Chikaraishi; Kouichi Satoh, both of Gunma, Japan

[73] Assignee: NSK Ltd., Tokyo, Japan

[21] Appl. No.: 919,195

[22] Filed: Aug. 28, 1997

[30] Foreign Application Priority Data

Sep. 3, 1996 [JP] Japan .................... 8-250873
Dec. 3, 1996 [JP] Japan .................... 8-336259

[51] Int. Cl.$^6$ .................................... G01L 3/10
[52] U.S. Cl. .................. 73/862.331; 73/862.28
[58] Field of Search ............. 73/862.28, 862.321, 73/862.328, 862.331, 862.332

[56] References Cited

U.S. PATENT DOCUMENTS

| | | | |
|---|---|---|---|
| 2,737,049 | 3/1956 | Waugh | 73/862.332 |
| 2,754,683 | 7/1956 | Waugh | 73/862.332 |
| 4,356,732 | 11/1982 | Hachtel et al. | 73/862.33 |
| 4,881,414 | 11/1989 | Sttaka et al. | 73/862.332 |
| 4,907,460 | 3/1990 | Taniguchi et al. | 73/862.33 |
| 5,323,659 | 6/1994 | Wakamiya et al. | 73/862.28 |
| 5,578,767 | 11/1996 | Chikaraishi et al. | 73/862.331 |
| 5,585,573 | 12/1996 | Satoh et al. | 73/862.331 |

FOREIGN PATENT DOCUMENTS

| | | | |
|---|---|---|---|
| 0 362 890 | 4/1990 | European Pat. Off. | G01L 3/10 |
| 2-89338 | 7/1990 | Japan | G01L 3/10 |
| 4-47638 | 2/1992 | Japan | H01J 9/44 |

*Primary Examiner*—Ronald L. Biegel
*Attorney, Agent, or Firm*—Sughrue, Mion, Zinn, Macpeak & Seas, PLLC

[57] ABSTRACT

Two coaxial circumferential grooves formed apart from each other in an axial direction are provided for a coil bobbin made of a non-conductive material, such as plastic, and arranged to be secured in a housing coaxially with an input shaft and an output shaft. Moreover, a torque detection coil is wound around each of the circumferential grooves. A terminal mounting portion is formed on the end surface of a connecting portion facing outwards in the radial direction to further outwardly project in the radial direction. Three metal terminals are secured to the upper surface of the terminal mounting portion. An end of one of the coils is wound around the first terminal, an end of the other coil is wound around the second terminal, and other ends of the two coils are wound around the third terminal. A yoke is composed of a first annular member for covering the outer surface and one of end surfaces of the coil and having an L-shape cross section, and a second annular member for covering another end surface of the coil and having a rectangular cross section. A portion of the first annular member for covering the outer surface of the coil also covers the outer surface of the second annular member, and the portion is provided with three cut portions having the same dimensions and formed at the same intervals in the circumferential direction. Each of the cut portions has dimensions with which it somewhat overlaps the outer surface of the coil. A terminal holding member having terminals for drawing the end of the coil to the outside is secured to the outer surface of the second annular member so as to be received in one of the three cut portions.

4 Claims, 12 Drawing Sheets

TORQUE SENSOR

BACKGROUND OF THE INVENTION

The present invention relates to a torque sensor for detecting torque generated in a rotating shaft, and more particularly to a torque sensor including two coils having impedance levels which are changed in opposite directions in accordance with generated torque so as to detect torque in accordance with the difference in the terminal voltages of the two coils and exhibiting improved accuracy to detect the torque.

Conventional torque sensors have been disclosed in, for example, Japanese Patent Unexamined Publication No. Hei. 4-47638 and Japanese Patent Unexamined Publication No. Hei. 8-5477. The conventional torque sensors have a structure that the torque acting on a rotating shaft is reflected to change in the impedance levels of the coils, and change in the impedance levels are detected so that the torque is detected. That is, the coils are disposed to surround the rotating shaft in such a manner that the impedance levels of the coils are changed due to magnetic or mechanical structural change corresponding to the torque of the rotating shaft. Therefore, detection of the change in the impedance by measuring the terminal voltages of the coils enables the torque generated in the rotating shaft to be detected. Moreover, the above-mentioned conventional torque sensor is arranged to set off change in the impedance of the coils occurring due to factors other than the torque, such as the temperature, by employing a structure that two coils having impedance levels which are changed in opposite directions by the torque are disposed to form a bridge circuit including the two coils so that torque is detected in accordance with the difference between two outputs from the bridge circuit. That is, even if the impedance is changed due to factors other than the torque, the change in the impedance levels of the two coils occurs in the same direction due to the factors. Therefore, the change can be set off by obtaining the difference in the output voltage from the bridge circuit.

However, the conventional torque sensor having the two coils for obtaining the difference and wound around individual coil bobbins is needed to be free from dispersion in the winding tensions of the coils wound around the respective coil bobbins and the diameters of the wires of the coils. However, a coil winding machine for use in a usual manufacturing process for winding the wire around the coil bobbin encounters change in the winding tension as the time elapses depending upon a state of use. A plurality of coil winding machines are simultaneously operated in general. Therefore, dispersion in the winding tensions among the machines cannot be prevented. What is worse, also the diameters and the like of the wires for forming the coils are dispersed. When two coil bobbins around which coils are continuously wound by the same coil winding machine are included in one torque sensor, the change in the impedance levels of the coils occurring due to factors other than the torque can substantially be set off because the torque sensor uses the two coils having substantially the same characteristics. However, the managing cost cannot be reduced in the above-mentioned case. If the above-mentioned management is not performed, an assumption is made that two coils considered to be having characteristics which are not substantially the same are used. Therefore, adjustment of the balance of the complicated bridge circuit must be performed, thus resulting in the manufacturing cost being enlarged.

Also, another conventional torque sensor has been disclosed in, for example, Japanese Utility Model Unexamined Publication No. Hei. 2-89338. The conventional torque sensor is structured in such a manner that the torque acting on the rotating shaft is reflected to change in the impedance of the coil to detect the change in the impedance so as to detect the torque.

The coil is disposed to surround the rotating shaft to change the impedance of the coil corresponding to the torque of the rotating shaft. Therefore, when the change in the impedance is detected by measuring the terminal voltages of the coil, the torque which is being generated in the rotating shaft can be detected.

The above-mentioned conventional torque sensor comprises the coil wound around a bobbin and having an outer surface and two end surfaces covered with an iron yoke member to prevent leakage of flux. However, since the ends of the coil are required to be drawn to the outside of the yoke member, the yoke member is provided with a cut portion for outwards drawing the end of the coil.

Since the magnetic field in the coil is, in the above-mentioned case, made to be irregular in the circumferential direction due to the cut portion, the difference between the phase of the coil and that of the rotating shaft results in change of the number of fluxes intersecting the coil. As a result, the impedance of the coil is undesirably changed regardless of the torque. Thus, the torque detection accuracy deteriorates by a corresponding degree.

When a structure is formed, as has been employed by the torque sensor disclosed in the above publication, in such a manner that two coils, the impedance levels of which are changed in opposite directions to correspond to the torque, are provided to form a bridge circuit including the two coils so as to detect the torque in accordance with the difference between two outputs from the bridge circuit, the impedance change occurring due to the temperature or the like can be set off by the difference. However, the impedance change occurring due to the cut portion is undesirably amplified and included in the detected torque.

SUMMARY OF THE INVENTION

In view of the problems experienced with the conventional structures, a first object of the present invention is to provide a torque sensor capable of reducing the cost and improving a detection accuracy.

Further, a second object of the present invention is to provide a torque sensor capable of improving torque detection accuracy by reducing change in the impedance occurring due to a cut portion.

To achieve the above-mentioned first object, a torque sensor according to the present invention comprises a rotating shaft rotatively supported in a housing; two coils disposed to surround the rotating shaft; and impedance changing means for changing impedance levels of the two coils in opposite directions in accordance with change in torque acting on the rotating shaft so as to detect torque generated in the rotating shaft in accordance with the difference between terminal voltages of the two coils, and further, the torque sensor comprises: a coil bobbin secured to the housing to be coaxial with the rotating shaft, wherein two grooves are formed in the coil bobbin to be apart from each other in the axial direction and coaxial with the rotating shaft, and the coil is wound along each of the two grooves.

The coil bobbin may be an integrally molded product or the coils may be wound after two or more pieces have been assembled.

According to the present invention, the coils respectively are wound along two grooves in one coil bobbin. Therefore, any complicated management and the like are not required when two coils having substantially the same specifications are mounted in one torque sensor. Therefore, impedance errors between the two coils can be reduced considerably. Even if, for example, a bridge circuit is formed, adjustment of the balance of the circuit can be omitted or performed simply.

A gap may be formed between the two grooves in the coil bobbin to receive, for example, an annular yoke member. Moreover, two cylindrical yoke members may be disposed to surround the two groove portions in the coil bobbin so that portions of each coil except for the inner portion are covered with the yokes.

A terminal attachment portion having three terminals projecting outwards in the radial direction is provided for a portion between the two grooves of the coil bobbin in such a manner that an end of one of the coils at which winding of the coil is started is secured to the first terminal. Moreover, an end of the other coil at which winding is ended is secured to the second terminal. An end of the coil at which winding is ended and an end of the other coil at which winding is started, are secured to the third terminal. As a result, the third terminal is formed into a common terminal to which the ends of the two coils are secured. Therefore, if the winding order is determined as, for example, the first terminal→third terminal→the second terminal, the two coils can continuously be formed by winding one wire. In the case where the wire is wound in the above-mentioned winding order, it is preferable that the direction in which the wire is wound along the two grooves in the coil bobbin be reversed at a position near the third terminal. That is, if the above-mentioned winding structure is employed in which, for example, the third terminal, which is the common terminal, is used as an earth terminal, the first terminal is used as a power source side terminal of one of the coils and the second terminal is used as the power source side terminal of the other terminal, drive currents flowing in the same direction can be supplied to the two coils.

To achieve a second object, a torque sensor according to the present invention comprises first and second rotating shafts disposed coaxially and connected to each other through a torsion bar; a cylindrical member made of a conductive and non-magnetic material and integrated with the second rotating shaft in the direction of rotation to surround the outer surface of the first rotating shaft; a surrounded portion of the first rotating shaft surrounded by at least the cylindrical portion and made of a magnetic material; a groove formed in the surrounded portion and extending in an axial direction; a window formed in the cylindrical member in such a manner that a state of superimposition on the groove is changed in accordance with a relative rotational position with respect to the first rotating shaft; and a coil disposed to surround a portion of the cylindrical member in which the window has been formed so that torque generated in the first and second rotating shafts is detected in accordance with change in the impedance of the coil, wherein a yoke member including the coil is provided with a first cut portion for drawing an end of the coil to the outside of the yoke member and at least one second cut portion individual from the first cut portion so that change in the impedance of the coil occurring due to irregularity of a magnetic field in the coil caused by the first cut portion and change in the impedance of the coil occurring due to irregularity of the magnetic field in the coil caused by the second cut portion are mutually reduced.

The non-magnetic material according to the present invention is a paramagnetic material and some of diamagnetic substances. The magnetic material is a ferromagnetic material. The magnetic permeability of the non-magnetic material is similar to that of air and smaller the magnetic permeability of the magnetic material.

DETAILED DESCRIPTION OF THE INVENTION

Preferred embodiments of the present invention will now be described with reference to the drawings.

FIGS. 1 to 10 are diagrams showing a first embodiment of the present invention, in which a torque sensor according to the present invention is applied to an electric power steering apparatus for a vehicle.

Figure 1:
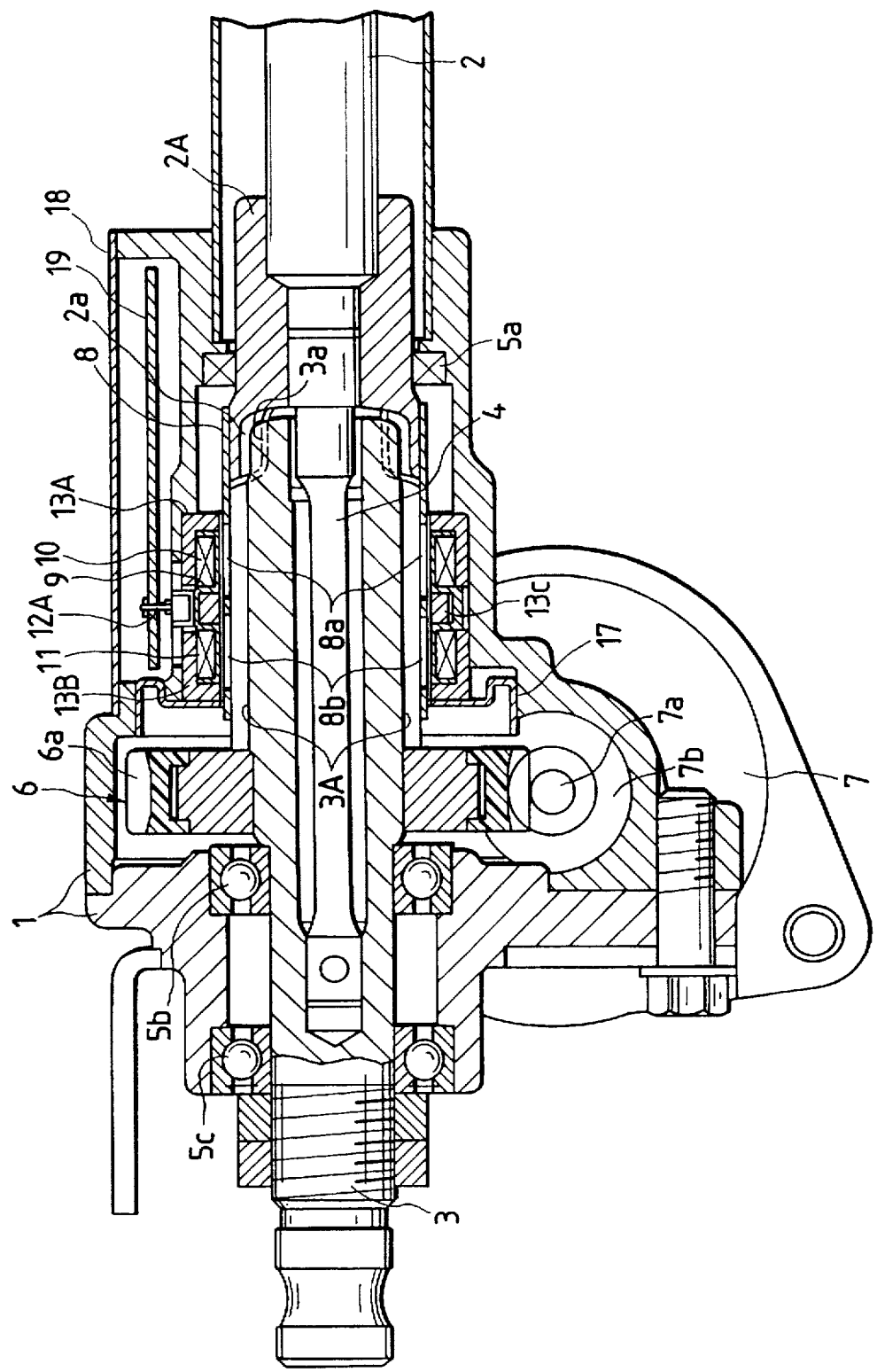
FIG. 1 is an overall cross sectional view showing the present invention.

Initially, the structure will now be described. In FIG. 1, a housing 1 includes an input shaft 2 and an output shaft 3 which are connected to each other through a torsion bar 4 and which are rotatively supported by bearings 5a, 5b and 5c. The input shaft 2, the output shaft 3 and the torsion bar 4 are disposed coaxially. The input shaft 2 and the torsion bar 4 are connected to each other through a sleeve 2A to which each end is spline-connected. Another end of the torsion bar 4 is spline-connected to a deep position in the output shaft 3. The input shaft 2 and the output shaft 3 are made of a magnetic material, such as iron. Note that the input shaft 2, the output shaft 3, and the torsion bar 4 correspond to the rotating shaft of the present invention.

A steering wheel is, in the direction of rotation, integrally attached to a right-hand end (not shown) of the input shaft 2 when viewed in FIG. 1. A pinion shaft forming, for example, a known rack and pinion steering apparatus, is connected to the left-hand end (not shown) of the output shaft 3 when viewed in FIG. 1. Therefore, the steering force generated when a driver has operated the steering wheel is transmitted to wheels (not shown) which must be steered through the input shaft 2, the torsion bar 4, the output shaft 3 and the rack and pinion steering apparatus.

The sleeve 2A secured to the end of the input shaft 2 has a length which is sufficiently long to surround the outer surface of the end of the output shaft 3. A plurality of projections 2a elongated in the axial direction are formed on the inner surface of a portion surrounding the outer surface of the end of the output shaft 3 of the sleeve 2A. A plurality of (the same number as that of the projections 2a) grooves 3a elongated in the axial direction are formed in the outer surface of the output shaft 3 opposite to the projections 2a. The projections 2a and the grooves 3a are engaged to one another with clearances permitted in the circumferential direction. As a result, relative rotation between the input shaft 2 and the output shaft 3 exceeding a predetermined range (for example, about ±5°) is prevented.

A worm wheel 6, arranged to be rotated coaxially and integrally with the output shaft 3, is attached to the outer surface of the output shaft 3. A resin engagement portion 6a of the worm wheel 6 and a worm 7b formed on the outer surface of an output shaft 7a of an electric motor 7 are engaged to each other. Therefore, the rotational force of the electric motor 7 is, through the output shaft 7a, the worm 7b and the worm wheel 6, transmitted to the output shaft 3. When the direction of rotation of the electric motor 7 is arbitrarily switched, assist steering torque in an arbitrary direction can be applied to the output shaft 3.

A cylindrical member 8 having a thin wall is integrally secured to the sleeve 2A in the direction of rotation in such a manner that the cylindrical member 8 is disposed adjacent to the outer surface of the output shaft 3 to surround the outer surface.

Figure 2:
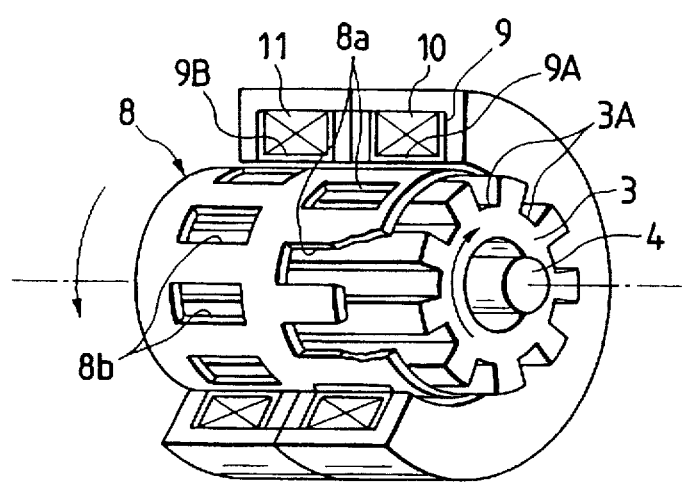
FIG. 2 is a perspective view showing the structure of a coil and a portion around the coil.

That is, the cylindrical member 8 is made of a conductive and non-magnetic material (for example, aluminum). Also as shown in FIG. 2 which is a perspective view showing the cylindrical member 8 and a portion around the same, a plurality (9 in this embodiment) of rectangular windows 8a apart from one another at the same intervals in the circumferential direction are formed in a portion of the cylindrical member 8 surrounding the output shaft 3 at positions near the sleeve 2A. Moreover, a plurality (9 in this embodiment) of rectangular windows 8b (having the same shape as that of the windows 8a) apart from one another in the circumferential direction are formed at positions distant from the sleeve 2A in such a manner that the phase is deviated from the windows 8a by 180 degrees.

A plurality (the same number as that of the windows 8a and 8b, that is, 9 in this embodiment) of grooves 3A each having a substantially rectangular horizontal cross sectional shape and elongated in the axial direction are formed in the outer surface of the output shaft 3 surrounded by the cylindrical member 8.

More specifically, an angle obtained by dividing the circumference of the cylindrical member 8 with N (N=9 in this embodiment) is assumed to be one periodic angle θ (=360/N and θ=40 degrees in this embodiment). The windows 8a are formed in the cylindrical member 8 in the portions distant from the output shaft 3 at predetermined angles from one end of one periodic angle θ range, while residual portions are closed. The windows 8b are formed in the portions of the cylindrical member 8 near the output shaft 3 at predetermined angles from another end of the one periodic angle θ range in such a manner that the phase from the windows 8a is deviated by a half period (θ/2), while residual portions are closed.

However, the structure is formed in such a manner that the widthwise central portions of the windows 8a in the circumferential direction and one of the circumferential ends of the grooves 3A are superimposed and the widthwise central portions of the windows 8b in the circumferential direction and other circumferential direction ends of the grooves 3A are superimposed when the torsion bar 4 is free from torsion (when the steering torque is zero). Therefore, the state of the superimposition between the windows 8a and the grooves 3A and the state of the superimposition between the windows 8b and the grooves 3a are made to be opposite in the circumferential direction. Thus, the widthwise central portions of the windows 8a and 8b in the circumferential direction and the widthwise central portions of the grooves 3A in the circumferential direction are shifted from each other by θ/4.

The cylindrical member 8 is surrounded by a coil bobbin 9 around which two coils 10 and 11 having the same specification are wound. That is, the coils 10 and 11 are disposed coaxially with the cylindrical member 8. The coil 10 is wound around the coil bobbin 9 to surround the portions in which the windows 8a are formed, while the coil 11 is wound around the coil bobbin 9 to surround the portions in which the windows 8b are formed.

Figure 3:
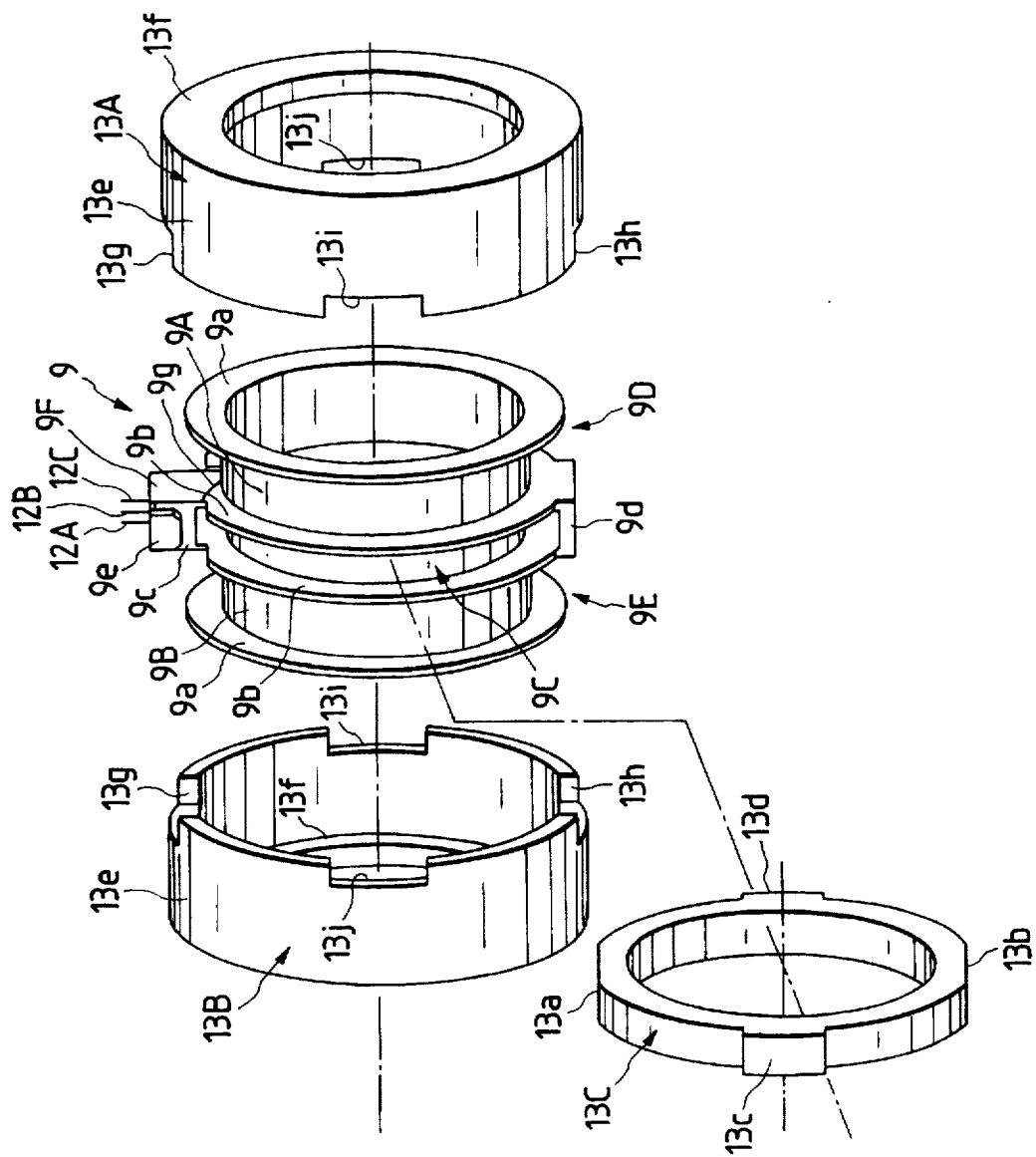
FIG. 3 is a perspective view showing a state where a coil bobbin and yoke members have been assembled.

The coil bobbin 9 is a member made of a non-conductive material, such as plastic and secured to the housing 1 coaxially with the input shaft 2 and the output shaft 3. The coil bobbin 9 is, as shown in FIG. 3 which is a perspective view, FIG. 4 which is a plan view, FIG. 5 which is a cross sectional view taken along line A—A shown in FIG. 4 and FIG. 6 which is a side view, has two coaxial circumferential grooves 9A and 9B formed apart from each other in the axial direction. The coil 10 is wound along the circumferential groove 9A, while the coil 11 is wound along the circumferential groove 9B. More specifically, the coil bobbin 9 has two cylindrical portions 9D and 9E formed apart from each other in the axial direction through a gap 9C and having the same dimensions. Outer flanges 9a are formed at the outer ends of the cylindrical portions 9D and 9E facing outside, while inner flanges 9b are formed at the inner ends opposite to each other. The inner flanges 9b of the cylindrical portions 9D and 9E are connected to each other through connecting portions 9c and 9d respectively formed at two positions apart from each other in the circumferential direction by 180 degrees. Each of the connecting portions 9c and 9d is formed into a recessed shape projecting outwards in the radial direction to cross the gap 9C.

A substantially rectangular parallelopiped terminal mounting portion 9F is formed on an end surface of the connecting portion 9c facing outside in the radial direction, the terminal mounting portion 9F projecting outwards over the end surface in the radial direction. Three metal terminals 12A, 12B and 12C are secured to the upper surface of the terminal mounting portion 9F in such a manner that they project outwards in the radial direction. The terminals 12A to 12C are secured to be apart from one another at predetermined intervals in the direction of tangents of the circumferential grooves 9A and 9B. When the cylindrical portion 9D is viewed from a portion adjacent to the outer flange 9a (see FIG. 5) in a state where the terminal mounting portion 9F is disposed in the upper portion, the left-hand terminal is called a first terminal 12A, the central terminal is called a second terminal 12B and the right-hand terminal is called a third terminal 12C.

Figure 5:
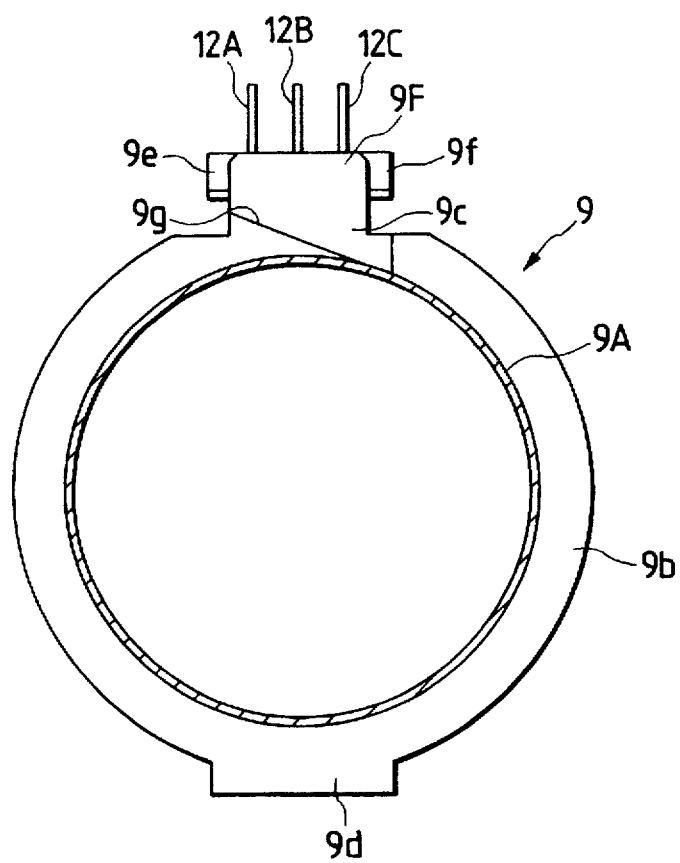
FIG. 5 is a cross sectional view taken along line A—A shown in FIG. 4.
Figure 6:
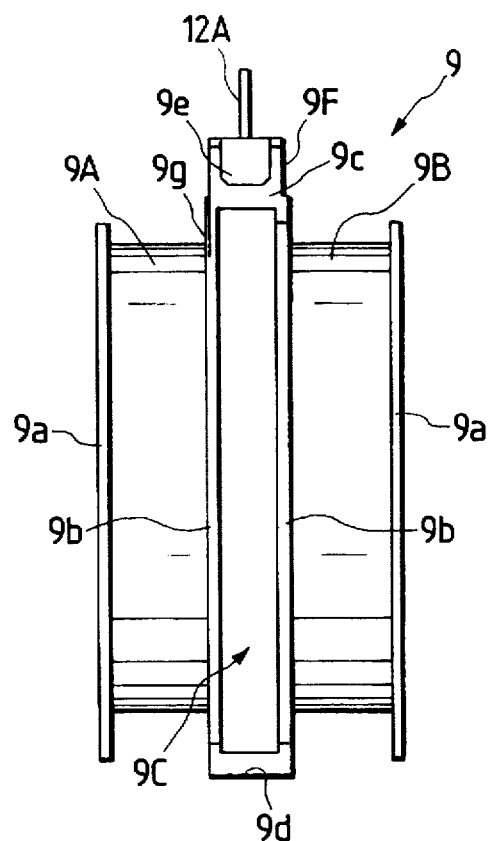
FIG. 6 is a side view showing the coil bobbin.

Two projections 9e and 9f projecting in the directions of the tangents of the circumferential grooves 9A and 9B are formed on the two end surfaces of the terminal mounting portion 9F. The projections 9e and 9f are thin projections each having a width and a height smaller than those of the end surface of the terminal mounting portion 9F. Moreover, a thin step portion 9g extending diagonally downwards to the right from a position below the projection 9e shown in FIG. 5 is formed in the side surface of the terminal mounting portion 9F and the connecting portion 9c adjacent to the circumferential groove 9A by somewhat thickening the portion near the circumferential groove 9A. Similarly, a thin step portion 9h extending diagonally downwards from a position below the projection 9f is formed in the side surface of the terminal mounting portion 9F and the connecting portion 9c adjacent to the circumferential groove 9B by somewhat thickening the portion near the circumferential groove 9B.

The coils 10 and 11 are wound along the circumferential grooves 9A and 9B of the coil bobbin 9 having the above-mentioned shape. The coils 10 and 11 are continuously wound by one coil winding machine. The procedure for winding the coils 10 and 11 will now be described with reference to FIG. 4. Initially, a wire is counterclockwise wound to the first terminal 12A, and then the wire is pulled diagonally upwards to the left as indicated by ① shown in FIG. 4 to introduce the wire from the side surface of the projection 9e adjacent to the circumferential groove 9B into the lower surface portion, followed by drawing the wire to the position adjacent to the circumferential groove 9A. The wire drawn to the position adjacent to the circumferential groove 9A is allowed to gradually approach the surface of the circumferential groove 9A along the step portion 9g. Then, the wire is clockwise wound around the circumferential groove 9A by a predetermined number of time in a state where the circumferential groove 9A is viewed from a position near the outer flange 9a (see FIG. 5).

Figure 4:
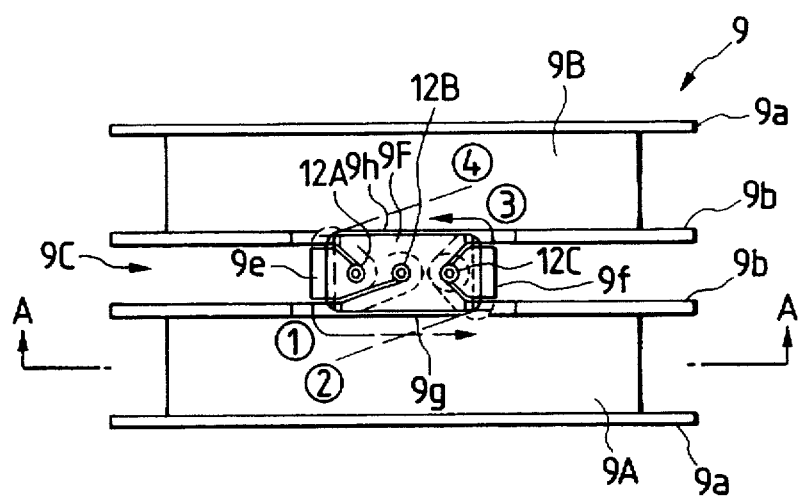
FIG. 4 is a plan view showing the coil bobbin.

After the wire has been wound around the circumferential groove 9A by the predetermined number of times, the wire is again separated from the circumferential groove 9A as indicated with ② shown in FIG. 4. Then, the wire is drawn from the lower surface of the projection 9f to the upper surface of the terminal mounting portion 9F through the side surface adjacent to the circumferential groove 9B. Then, the wire is counterclockwise wound around the third terminal 12C several times. Then, as indicated with ③ shown in FIG. 4, the wire is drawn diagonally downwards to the right when viewed in FIG. 4. Then, the wire is introduced from the side surface of the projection 9f adjacent to the circumferential groove 9A into the lower surface position, and then drawn to a position adjacent to the circumferential groove 9B. The wire drawn to the position near the circumferential groove 9B is allowed to gradually approach the surface of the circumferential groove 9B along the step portion 9h. Then, the wire is clockwise wound around the circumferential groove 9B by a predetermined number of times in a state where the circumferential groove 9B is viewed from a position adjacent to the outer flange 9a.

After the wire has been wound around the circumferential groove 9B by the predetermined number of times, the wire is again separated from the circumferential groove 9B as indicated with ④ shown in FIG. 4, and then the wire is drawn to the upper surface portion of the terminal mounting portion 9F from the lower surface of the projection 9e through the side surface adjacent to the circumferential groove 9A. Then, the wire is counterclockwise wound around the second terminal 12B several times. Thus, the operation for winding the wire is completed.

In the above-mentioned state, the wire in the form that a conductive wire is covered with an insulating member is wound around each of the terminals 12A to 12C. Therefore, no conduction is established between each of the terminal 12A to 12C and the wire. If the terminals 12A to 12C are, from their leading ends, immersed in a solder tank after the winding operation has been completed, solder is allowed to adhere to each of the terminals 12A to 12C. Moreover, the cover for the wire is melted with heat of the solder. Therefore, each of the terminals 12A to 12C and the wire can be conducted. As can be understood also from FIG. 4, the above-mentioned winding procedure is able to prevent crossing of the wire on the upper surface of the terminal mounting portion 9F. Therefore, short circuit of the wire can be prevented when the soldering is performed.

As shown in FIG. 3 in an exploded manner, yoke members 13A and 13B each having a substantially cylindrical shape are secured to the coil bobbin 9 to cover the circumferential grooves 9A and 9B from outside. Moreover, a substantially annular yoke member 13C is received in the gap 9C of the coil bobbin 9.

Figure 7:
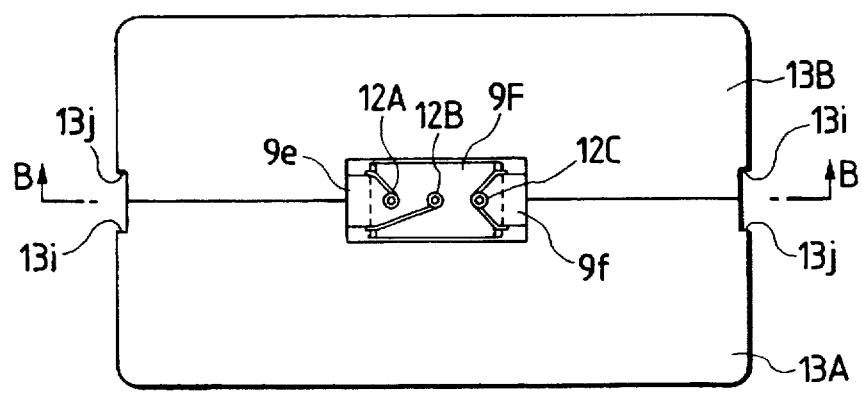
FIG. 7 is a plan view showing the coil bobbin in a state where the yoke members have been mounted.
Figure 9:
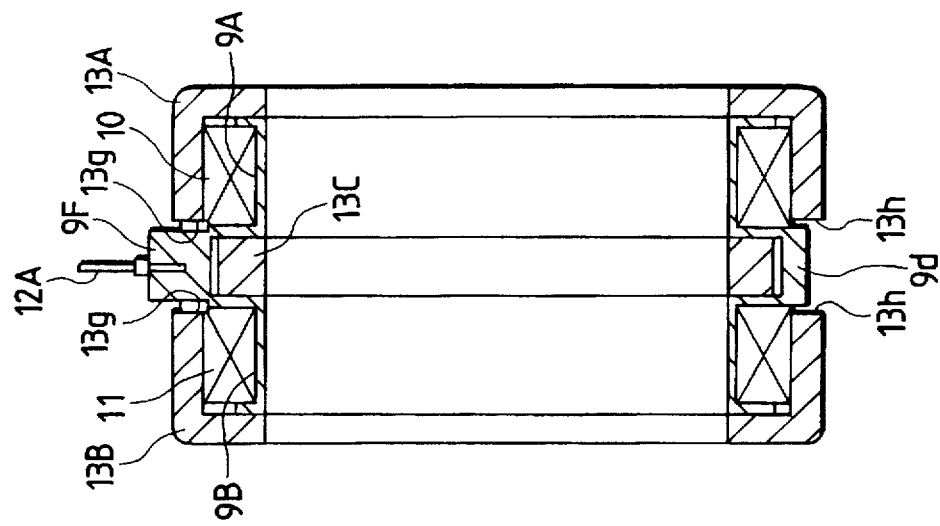
FIG. 9 is a cross sectional view taken along line C—C shown in FIG. 8.
Figure 8:
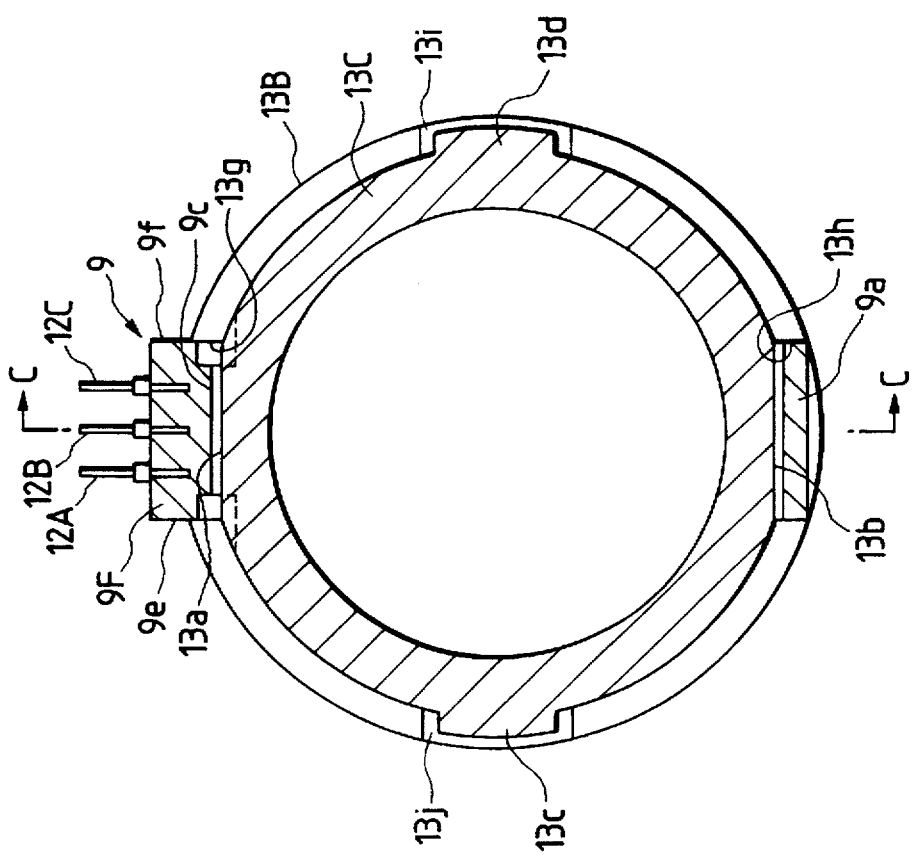
FIG. 8 is a cross sectional view taken along line B—B shown in FIG. 7.

Also as shown in FIG. 7 which is a plan view showing a state where each of the yoke members 13A to 13C is secured, FIG. 8 which is a cross sectional view taken along line B—B shown in FIG. 7 and FIG. 9 which is a cross sectional view taken along line C—C shown in FIG. 8, the yoke member 13C has flat portions 13a and 13b formed apart from each other by an angular degree of 180° in the circumferential direction of the outer surface of the yoke member 13C so as to be allowed to fit the radial directional inner surfaces of the two connecting portions 9c and 9d crossing the gap 9C. Moreover, the inner diameter of the yoke member 13C is the same as the inner diameter of each of the cylindrical portions 9D and 9E, while the outer diameter of the yoke member 13C is the same as the outer diameter of the inner flange portion 9b. However, projections 13c and 13d each having the same width as that of the yoke member 13C and outwards projecting in the radial direction by a thickness somewhat smaller than the wall thickness of each of the yoke members 13A and 13B are formed at two positions respectively apart from the flat portions 13a and 13b on the outer surface of the yoke member 13C by an angular degree of 90° C. Therefore, when the yoke member 13C is received in the gap 9C of the coil bobbin 9, the projections 13c and 13d project over the inner flange 9b.

On the other hand, the yoke members 13A and 13B have the same shape and composed of a cylindrical portion 13d for covering the coil bobbin 9 around which the coils 10 and 11 have been wound and an annular bottom portion 13e formed at an end which faces outwards in the axial direction when secured to the coil bobbin 9. The inner diameter of the bottom portion 13e is the same as the inner diameter of each of the cylindrical portions 9D and 9E of the coil bobbin 9. Moreover, four recesses 13g, 13h, 13i and 13j apart from one another by an annular degree of 90° in the circumferential direction are formed in the end portion opposite to the bottom portion 13e of the cylindrical portion 13d.

Among the recesses 13g to 13j, the recess 13g is a recess for receiving the terminal mounting portion 9F, the recess 13h is a recess for receiving the connecting portion 9d and recesses 13i and 13j are recesses for receiving the projections 13c and 13d of the yoke member 13C.

Each of the recesses 13i and 13j has a widthwise (a circumferential directional) dimension which is somewhat smaller than the lengthwise (the circumferential directional) dimension of each of the projections 13c and 13d. However, the dimension in the direction of the depth (the axial direction) is half of the dimension of the each of the projections 13c and 13d in the direction of the thickness (in the axial direction). Therefore, when the yoke member 13C is secured to the coil bobbin 9 and the yoke members 13A and 13B are attached to cover the same, the bottom surfaces of the recesses 13i and 13j are brought into contact with the projections 13c and 13d. Therefore, the axial directional positions of the yoke members 13A and 13B are fixed.

On the other hand, the recess 13g has a widthwise dimension which is the same as the lengthwise dimension of the terminal mounting portion 9F including the projections 9e and 9f. However, the dimension in the direction of its depth is larger than the half of the dimension of the terminal mounting portion 9F in the direction of its thickness. Similarly, the recess 13h has a widthwise dimension which is the same as the lengthwise dimension of the connection portion 9d. However, the dimension in the direction of its depth is slightly larger than the half of the dimension of the connecting portion 9d in the direction of its thickness. Therefore when the yoke members 13A and 13B are attached to cover the coil bobbin 9, the positions of the yoke members 13A and 13B are fixed because the inner surfaces of the recesses 13g and 13h are brought into contact with the end surfaces of the terminal mounting portion 9F and the connecting portion 9d.

Since the recess 13g has the above-mentioned dimensions, the inner surface of the recess 13g is brought into contact with the end surfaces of the projections 9e and 9f. However, gaps are formed between the side surfaces and lower surfaces of the projections 9e and 9f and the inner surface of the recess 13g. As a result, the wire for the coils 10 and 11 disposed along the outer surfaces of the projections 9e and 9f is not held between the inner surface of the recess 13g and the projections 9e and 9f. Therefore, breakage of the cover for the wire and thus causing a short circuit to take place between the yoke members 13A and 13B can be prevented.

Note that a space in the housing 1 in which the worm wheel 6 is disposed and a space of the same in which the coil bobbin 9 is disposed are isolated from each other by a metal seal member 17 so that lubricating oil supplied to an engagement portion between the worm wheel 6 and the electric motor 7 is prevented to be introduced into the portion including the coil bobbin 9.

Figure 10:
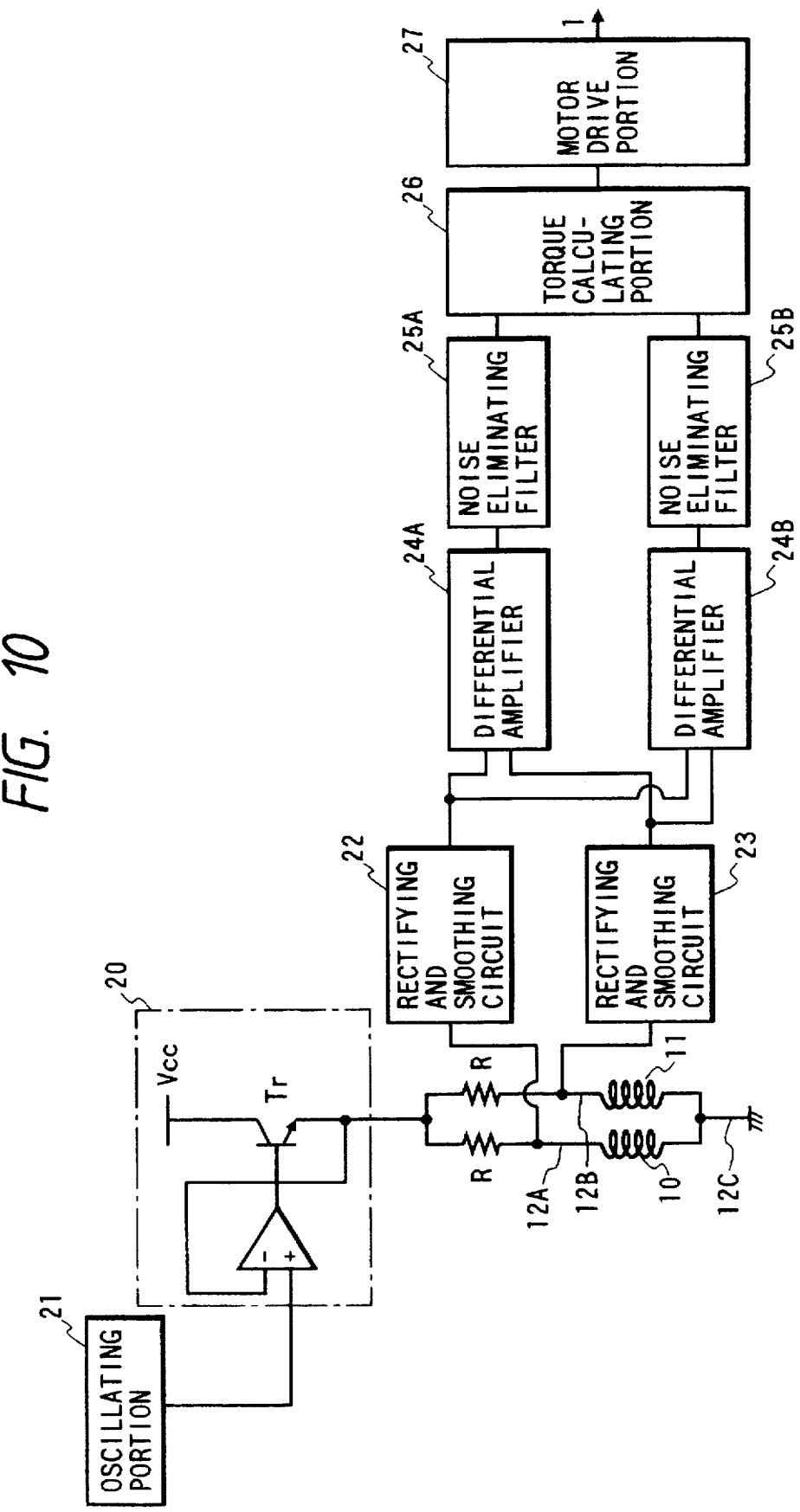
FIG. 10 is a circuit diagram showing an example of a motor control circuit.

The ends of the terminals 12A to 12C reach a sensor case 18 through the housing 1. The coils 10 and 11 are connected to a motor control circuit formed on a control board 19 in the sensor case 18 through the terminals 12A to 12C. The motor control circuit, as shown in FIG. 10, for example, comprises an oscillating portion 21 for supplying an AC current having a predetermined frequency to the coils 10 and 11 through a constant current portion 20; a rectifying and smoothing circuit 22 for rectifying and smoothing the terminal voltage of the coil 10 to transmit the voltage; a rectifying and smoothing circuit 23 for rectifying and smoothing the terminal voltage of the coil 11 to transmit the voltage; differential amplifiers 24A and 24B for amplifying the difference between the output from the rectifying and smoothing circuit 22 and that from the rectifying and smoothing circuit 23 to transmit the amplified difference; a noise eliminating filter 25A for eliminating a high frequency noise component from the output from the differential amplifier 24A; a noise eliminating filter 25B for eliminating a high frequency noise component from the output from the differential amplifier 24B; a torque calculating portion 26 which calculates the direction and degree of relative rotational displacement between the input shaft 2 and the cylindrical member 8 in accordance with the outputs, for example, a mean value from the noise eliminating filters 25A and 25B, and multiplies a result of the calculation with a predetermined proportional constant so as to detect the steering torque which is being generated in the steering system; and a motor drive portion 27 for supplying, to the electric motor 7, drive current I capable of generating steering assist torque for reducing the steering torque in accordance with a result of the calculation performed by the torque calculating portion 26.

In this embodiment, the coils 10 and 11 are connected to the motor control circuit through the three terminals 12A to 12C. Among the three terminals, the first terminal 12A, to which one of the ends (the end at which winding of the wire is started) of the coil 10 is connected, is connected to the portion including the oscillating portion 21 through electric resistor R, the second terminal 12B, to which one of the ends (the end at which winding of the wire is ended) of the coil 11 is connected, is connected to the portion including the oscillating portion 21 through other electric resistor R; and the third terminal 12C, which is a common terminal to which the other ends (an intermediate portion of the wire) of the coils 10 and 11 are connected, is connected to the earth.

The operation of this embodiment will now be described.

Assuming that the steering system is in a straight movement state and therefore the steering torque is zero, no relative rotation takes place between the input shaft 2 and the output shaft 3. Therefore, no relative rotation takes place between the output shaft 3 and the cylindrical member 8.

If rotational force is generated in the input shaft 2 because the steering wheel has been operated, the rotational force is transmitted to the output shaft 3 through the torsion bar 4. At this time, resistance corresponding to the frictional force between the steered wheels and the surface of the road and the frictional force generated owning to the engagement between gears of the rack and pinion steering apparatus (not shown) formed at the left-hand end of the drawing is generated in the output shaft 3. Therefore, relative rotation takes place between the input shaft 2 and the output shaft 3 in such a manner that the output shaft 3 is delayed because the torsion bar 4 is twisted. Moreover, relative rotation takes place also between the output shaft 3 and the cylindrical member 8.

In a state where the cylindrical member 8 has no window, generation of an alternative magnetic field in the coils with an AC current supplied to the coils results in an eddy current flowing on the outer surface of the cylindrical member 8 in a direction opposite to a direction in which the coil current flows because the cylindrical member 8 is made of the conductive and non-magnetic material.

When the magnetic field generated by the eddy current and the magnetic field generated by the coils are superimposed, the magnetic field in the cylindrical member 8 is set off.

When the windows 8a and 8b are provided for the cylindrical member 8, the eddy current generated on the outer surface of the cylindrical member 8 cannot flow along the outer surface because the windows 8a and 8b are formed. Therefore, the eddy current is introduced into the inner portion of the cylindrical member 8 along the end surfaces of the windows 8a and 8b, and flows along the inner surface in the same direction as the direction of the coil current. Then, the eddy current flows along the end surfaces of the adjacent windows 8a and 8b, and then returns to the outer surface. Thus, a loop is formed.

That is, a state is realized in which the loop of the eddy current is periodically (θ=360/N) disposed in the coil.

The magnetic fields generated by the coil current and the eddy current are superimposed so that periodical strength and weakness of the magnetic field in the circumferential direction and a magnetic field-having a gradient which is reduced in the direction toward the center are formed in the outer and inner portions of the cylindrical member 8. The strength and weakness of the magnetic field in the circumferential direction take place in such a manner that the magnetic field is intensified in the central portions of the windows 8a and 8b which are considerably affected by the adjacent eddy currents and is weakened in the portions shifted from the central portions by a half period (θ/2). Inside the cylindrical member 8, the output shaft 3 made of a magnetic material is disposed coaxially. The output shaft 3 has the projections and recesses having the same period as that of the windows 8a and 8b by the groove 3A. The magnetic member disposed in the magnetic field is magnetized and thus caused to generate spontaneous magnetization (magnetic flux) in an amount which is enlarged in accordance with the intensity of the magnetic field until the amount is saturated.

Therefore, the periodical strength and weakness in the circumferential direction generated by the cylindrical member 8 and the magnetic field having the gradient in the radial direction cause the spontaneous magnetization of the output shaft 3 to be enlarged or reduced in accordance with the relative phase with respect to the cylindrical member 8. The spontaneous magnetization is made to be maximum in a phase in which the centers of the windows 8a and 8b and the centers of the projections coincide with each other.

Corresponding to the change in the spontaneous magnetization, also the inductance of each of the coils 10 and 11 is changed in the form of substantially sine waves. In a state where no torque acts, a state shifted from the phase in which the spontaneous magnetization (the inductance) is made to be maximum by ¼ period (θ/4) is realized. Moreover, the phase of the window array adjacent to the sleeve 2A and that of the other window array is made to be different from each other by ½ period (θ/2) as described above.

Therefore, generation of the difference in the phase between the cylindrical member 8 and the output shaft 3 owning to the torque results in the inductance of one of the coils 10 and 11 being enlarged. On the other hand, the inductance of the other coil is reduced at the same rate. If the inductance of each of the coils 10 and 11 is changed as described above, also impedance levels of the coils 10 and 11 are changed similarly under condition that the frequencies of the electric currents supplied from the current amplifying portion 26 are constant. Moreover, the self-induction electromotive forces of the coils 10 and 11 are similarly changed. Therefore, the outputs from the differential amplifiers 24A and 24B for obtaining the difference between the terminal voltages between the coils 10 and 11 are changed in accordance with the direction and the magnitude of the steering torque. Since the differential amplifiers 24A and 24B detect the difference between the rectifying and smoothing circuit 22 and the rectifying and smoothing circuit 23, change in the self-inductance occurring owning to temperature or the like can be offset.

The torque calculating portion 26 calculates a mean value of the outputs from the differential amplifiers 24A and 24B supplied through the noise eliminating filters 25A and 25B, and then multiplies the mean value with, for example, a predetermined proportional constant so as to obtain the steering torque, followed by supplying a result to the motor drive portion 27. The motor drive portion 27 supplies, to the electric motor 7, drive current I corresponding to the direction and the magnitude of the steering torque.

As a result, rotational force corresponding to the direction and the magnitude of the steering torque generated in the steering system is generated in the electric motor 7. The rotational force is transmitted to the output shaft 3 through the worm gear and so forth. Thus, steering assist torque is supplied to the output shaft 3 and, therefore, the steering torque can be reduced and the load, which must be borne by the driver, can be reduced.

In this embodiment, the coils 10 and 11 are provided in order to set off the change in the self-inductance occurring due to the temperature or the like. The coils 10 and 11 are wound around the common coil bobbin 9. Moreover, the two coils 10 and 11 are continuously wound by one winding machine. Therefore, dispersion in the tensions and diameters of the wire of the coils 10 and 11 can significantly be prevented. Thus, any complicated management and the like are not required to mount the two coils 10 and 11, which are considered to have the same specifications, in one torque sensor. Since also deviation of the axes of the coils 10 and 11 can be prevented, the adjustment of the balance of the bridge circuit, which is needed to be performed when connected to the motor control circuit as shown in FIG. 10, is not needed or simplified. Therefore, without causing excessive enlargement of the cost, it is possible to reliably set off the change in the inductance of each of the coils 10 and 11 occurring due to factors other than the torque. As a result, a torque sensor exhibiting an excellent detecting accuracy can be realized.

Since this embodiment is arranged in such a manner that the above-mentioned procedure for winding the wire around the three terminals 12A to 12C is employed and the gaps are formed around the projections 9e and 9f to receive the wire, occurrence of a short circuit between intermediate portions of the wire and between the wire and the yoke member 13A or 13B can reliably be prevented.

Moreover, since this embodiment is arranged such that the cylindrical yoke members 13A and 13B and the annular yoke member 13C are arbitrarily engaged to each other, deviation of the axes of the overall bodies of the yoke members 13A and 13C is prevented. Moreover, deviation between the axis of each of the yoke members 13A to 13C and that of the coil bobbin 9 can be prevented. The above-mentioned advantages contribute to improve the detecting accuracy of the torque sensor.

Since the coil bobbin 9 is commonly used by the two coils 10 and 11, the number of elements can be reduced and the number of manufacturing processes required to assemble elements to the housing 1 can be reduced. Also this fact contributes to reducing the cost.

Since the wire is, in this embodiment, wound around the coil bobbin 9 with the above-mentioned procedure, each of the first terminal 12A and the second terminal 12B is connected to the power supply portion through the electric resistance R and the third terminal 12C which is a common terminal for the coils 10 and 11 is connected to the earth. Therefore, electric currents flow in the same direction in the coils 10 and 11 even if the wire is wound around the coils 10 and 11 in opposite directions. As a result, the coils 10 and 11 have the same polarity.

Although the above-mentioned embodiment is structured in such a manner that each of the first terminal 12A and the second terminal 12B is connected to the power source through the electric resistance R and the third terminal 12C is connected to the earth, the structure is not limited to this. For example, a structure may be employed in which the third terminal 12C is connected to the portion including the oscillating portion 21 through the constant current portion 20, the first terminal 12A is connected to the earth through the electric resistance R and the second terminal 12B is connected to the earth through the electric resistance R to detect the torque.

Although the above-mentioned embodiment has the structure in which the torque sensor according to the present invention is applied to an electric power steering apparatus for a vehicle, the present invention is not limited to this. The structure may be applied to a torque sensor for another purpose.

In this embodiment, the input shaft 2, the sleeve 2A, the output shaft 3, the groove 3A, the torsion bar 4 and the cylindrical member 8 form the impedance changing means.

Figure 11:
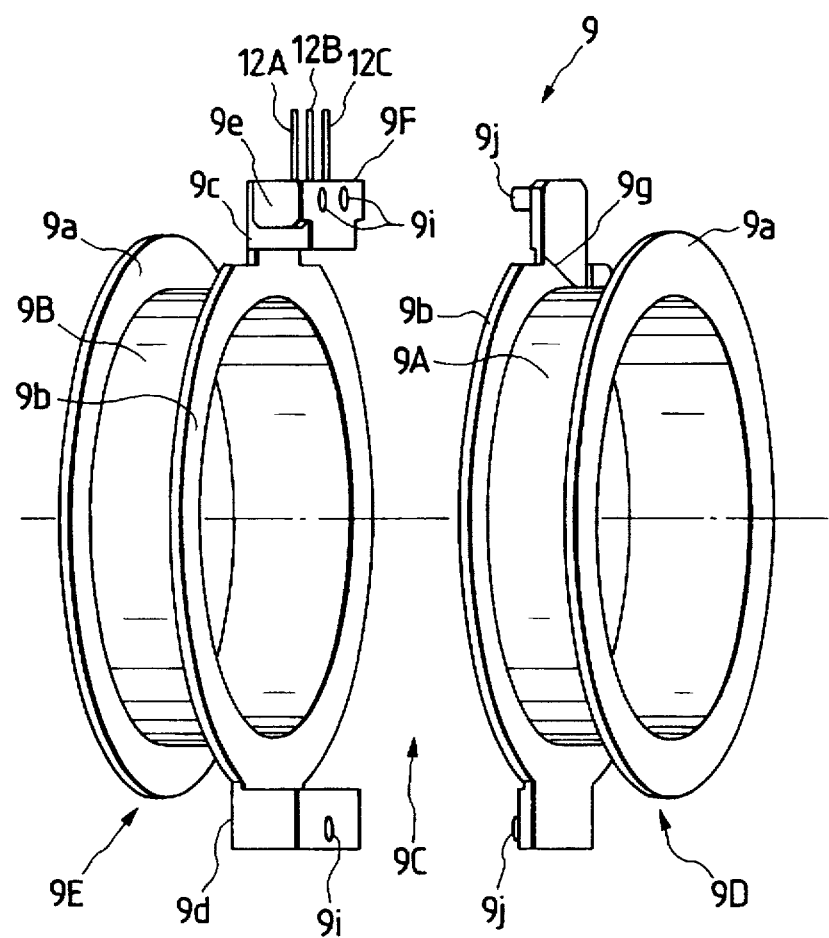
FIG. 11 is a perspective view showing an example state where the coil bobbin is formed into a division type bobbin.

Although the above-mentioned embodiment has the structure in which the coil bobbin 9 is the integrally molded product, the present invention is not limited to this. For example, a structure as shown in FIG. 11 may be employed in which the coil bobbin 9 can be divided for each of the cylindrical portions 9D and 9E at the connecting portions 9c and 9d. That is, each of the two molded elements obtained by dividing for each of the cylindrical portions 9D and 9E may be combined with each other so that the coil bobbin 9 is formed around which the coils 10 and 11 are wounded. In the case where the coil bobbin 9 is made to be the division type element, it can easily be manufactured with a low cost even if it has a complicated shape. To reduce the labor required to assemble the coil bobbin 9, a recess 9i and a projection 9j arranged to be engaged to the contact surface of each of the divided connecting portions 9c and 9d may be formed, as shown in FIG. 11.

As described above, according to the present invention in which the two grooves apart from each other in the axial direction and formed coaxially with the rotational shaft are provided for the coil bobbin secured in the housing and each of the coils is wound around each of the two grooves, dispersion in the tensions of the coils and diameters of the wire can significantly be reduced. Thus, the two coils considered to have the same specifications can be mounted on one torque sensor without complicated management. Therefore, an effect can be obtained in that change in the inductance of the coils occurring due to a factor other than the torque can reliably be set off without excessive increase of the cost.

A second embodiment of a torque sensor according to the present invention will next be described.

Figure 12:
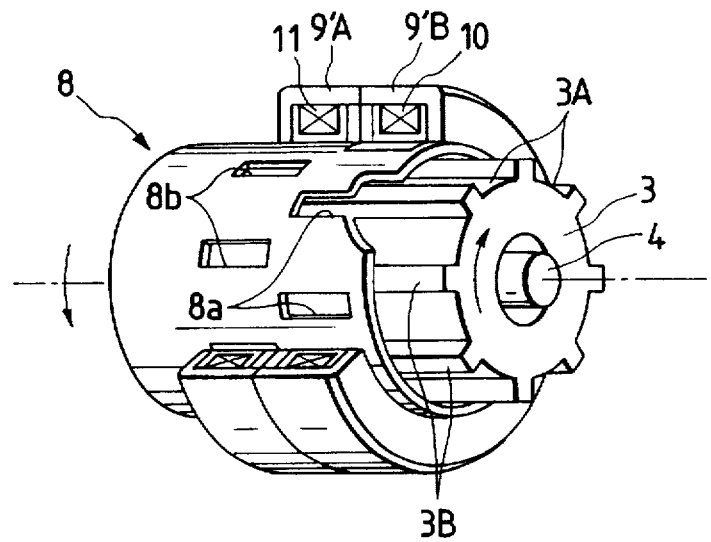
FIG. 12 is a perspective view showing the structures of the coil and a portion including the coil.

As shown in FIG. 12, the torque sensor of the second embodiment has the similar structure as that of the first embodiment shown in FIG. 2. The feature of the second embodiment is in the structure of yoke members covering the outer surface and both end surfaces of the respective coils 10 and 12. The other components of the torque sensor of the second embodiment may be the same as those of the torque sensor of the first embodiment, or those of a conventional torque sensor. In FIG. 12, the same components as those in FIG. 2 are designated by the same reference numerals and their explanation will be omitted.

The yoke members are made of iron. Since the yoke members have similar structures, the following description will be made on the yoke member 14 covering the coil 11.

Figure 13A:
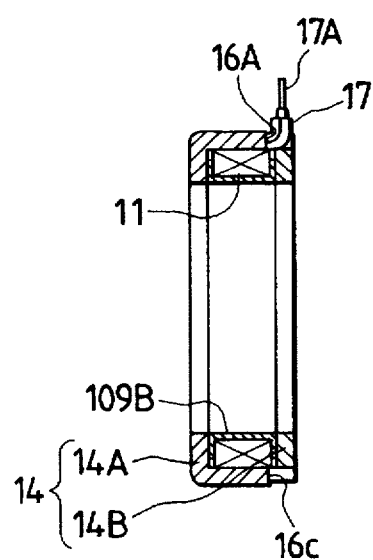
FIGS. 13(a) and 13(b) are views showing the structure of a yoke member.
Figure 13B:
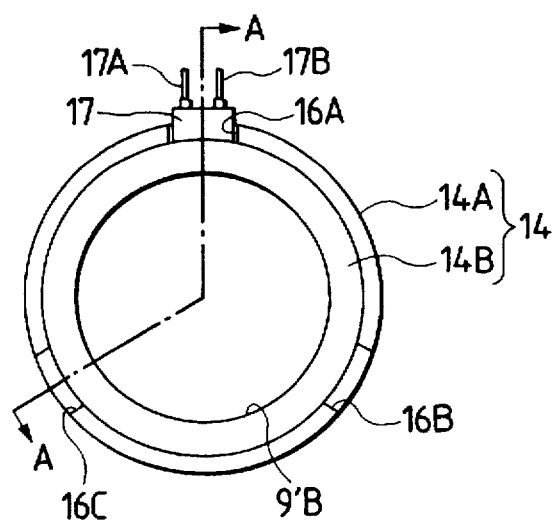

That is, FIG. 13(a) is a cross sectional view of the yoke member 14 and FIG. 13(b) is a front view of the yoke member 14. Note that FIG. 13(a) corresponds to a cross sectional view taken along line A—A shown in FIG. 3(b).

As shown in FIGS. 13(a) and 13(b), the yoke member 14 is composed of an annular member 14A for covering the outer surface and a portion of an end surface of the coil 11 and having an L-shape cross section; and an annular member 14B having a rectangular cross sectional shape for covering another end surface of the coil 11. The portion of the annular member 14A for covering the outer surface of the coil 11 also covers the outer surface of the annular member 14B. As a result, the overall outer surface and the two end surfaces of the coil 11 are covered with the yoke member 14.

Note that three cut portions 16A, 16B and 16C are formed in the portion of the annular member 14A for covering the annular member 14B at the same intervals in the circumferential direction (that is, angular degrees of 120°). Note that the cut portions 16A, 16B and 16C have dimensions determined in such a manner that they somewhat superimpose on the outer surface of the coil 11. A terminal holding member 17 made of a non-conductive material, such as plastic, is secured to the outer surface of the annular member 14B in such a manner that the terminal holding member 17 is received in the cut portion 16A. Two terminals 17A and 17B having leading ends facing outside in the radial direction are secured to the surface of the terminal holding member 17 facing outside in the radial direction. The base portion of the terminal 17A is connected to one of end portions of the coil 11, while the base portion of the other terminal 17B is connected to another end portion of the coil 11. As a result of the above-mentioned structure, the two ends of the coil 11 are drawn to the outside of the yoke member 14.

Although each of the cut portions 16B and 16C has the same dimension as that of the cut portion 16A, no terminal holding member or the like is provided to correspond to each of the cut portions 16B and 16C. Therefore, portions of the coil bobbins 9'A and 9'B are exposed to the outside in the portions in which the cut portions 16B and 16C are formed.

Also the other yoke member covering the coil 10 has a structure similar to that of the yoke member 14. The two yoke members may be disposed in the housing 1 of an electric power steering apparatus for a vehicle (see FIG. 1) in such a manner that the annular members of the respective yoke members are in contact with each other and the terminal mounting members of the respective yoke members are superimposed and abutted on each other.

The leading end of each of the four terminals 17A and 17B is allowed to pass through the housing 1 and reach the inner portion of the sensor case 18. The coils 10 and 11 are, through the terminals 17A and 17B, connected to a motor control circuit formed on the control board 19 in the sensor case 18.

The operation of the torque sensor of the second embodiment is the same as that of the first embodiment.

In this embodiment, the yoke members for holding the coils 10 and 11 in the inside portion thereof are, in addition to the cut portion 16A for outwards drawing the terminals of the coils 10 and 11, provided with cut portions 16B and 16C in such a manner that the positions of the cut portions 16A to 16C are shifted by angular degrees of 120° in the circumferential direction. Therefore, change in the impedance of each of the coils 10 and 11 occurring due to irregularity of the magnetic field in the inner portion of each of the coils 10 and 11 caused from each of the cut portions 16A to 16C can be reduced.

That is, it is assumed that the torque sensor of this embodiment is applied to the power steering apparatus as shown in FIG. 1, in which the change of the state of superimposition of the groove 3A and the windows 8a and 8b causes the impedance of each of the coils 10 and 11 to be changed. When eight sets of the groove 3A and the windows 8a and 8b exist in the circumferential direction, irregularity in the coils 10 and 11 occurring due to, for example, the cut portion 16A causes eight waves of change in the impedance regardless of the torque to appear for every rotation of the output shaft 3.

Note that change in the impedance regardless of the torque and occurring due to the irregularity of the magnetic flux in the coils 10 and 11 takes place also due to the cut portion 16B and to the cut portion 16C. Therefore, change in the impedance regardless of the torque and caused by each of the cut portions 16A to 16C is intensified or weakened by arbitrarily selecting the number and positions of the cut portions 16A to 16C.

If the respective yoke members are provided with a cut portion having the same dimensions as those of the cut portion 16A in addition to the cut portion 16A at a position deviated from the same by 180°, and when eight sets of the groove 3A and the windows 8a and 8b are disposed in the circumferential direction at the same intervals, changes in the impedance occurring due to the two cut portions are generated at the same timing. Therefore, the changes in the impedance mutually intensify the degree.

If the three cut portions 16A to 16C are formed as in this embodiment, and when eight sets of the groove 3A and the windows 8a and 8b exist in the circumferential direction at the same intervals, the phase of the positional relationship between the cut portion 16B and each groove 3A with respect to the positional relationship between, for example, the cut portion 16A and each groove 3A is delayed by $2\pi/3$. Moreover, the phase of the positional relationship between the cut portion 16C and each groove 3A is delayed by $4\pi/3$. Therefore, changes in the impedance regardless of the torque and due to each of the cut portions 16A to 16C are mutually weakened. As a result, change in the impedance is significantly reduced.

Figure 14:
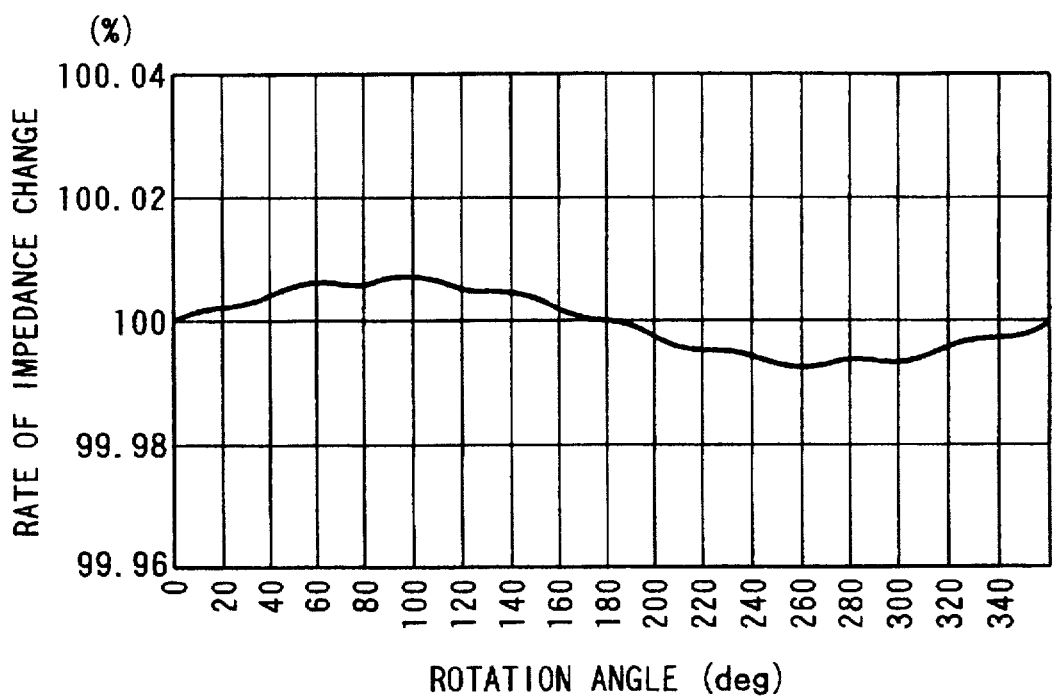
FIG. 14 is a graph showing a waveform indicating a rate of change in the impedance according to the invention.
Figure 15:
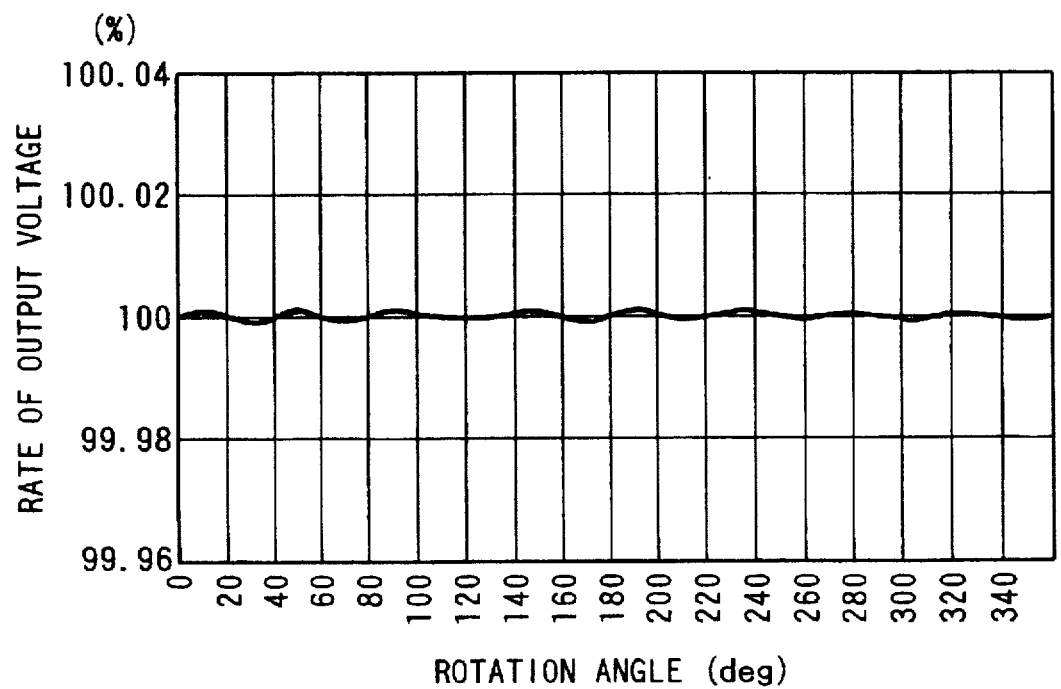
FIG. 15 is a graph showing a waveform indicating a change rate of the output voltage from the differential amplifier according to the invention.

FIG. 14 shows results of measurement of a rate of change in the impedance of the coil 10 when eight sets of the groove 3A and the windows 8a and 8b are provided, and when the input shaft 2 and the output shaft 3 have been rotated one time in a state where the torque is retained to be zero. According to the results, small amplitude and low frequency (one cycle per rotation) change and high frequency (eight cycles per rotation) change having a very small amplitude are observed in the impedance. Since the low frequency change occurs owning to errors committed when the groove 3A, the cylindrical member 8 and the like have been manufactured, elimination of the difference by the differential amplifiers 24A and 24B structured as shown in FIG. 10 enables the rate of change in the output voltage to be only high frequency change having very small amplitude, as shown in FIG. 15. Thus, significantly accurate detection of the torque can be performed. Therefore, accurate steering assist torque can be supplied to the steering system.

Figure 16:
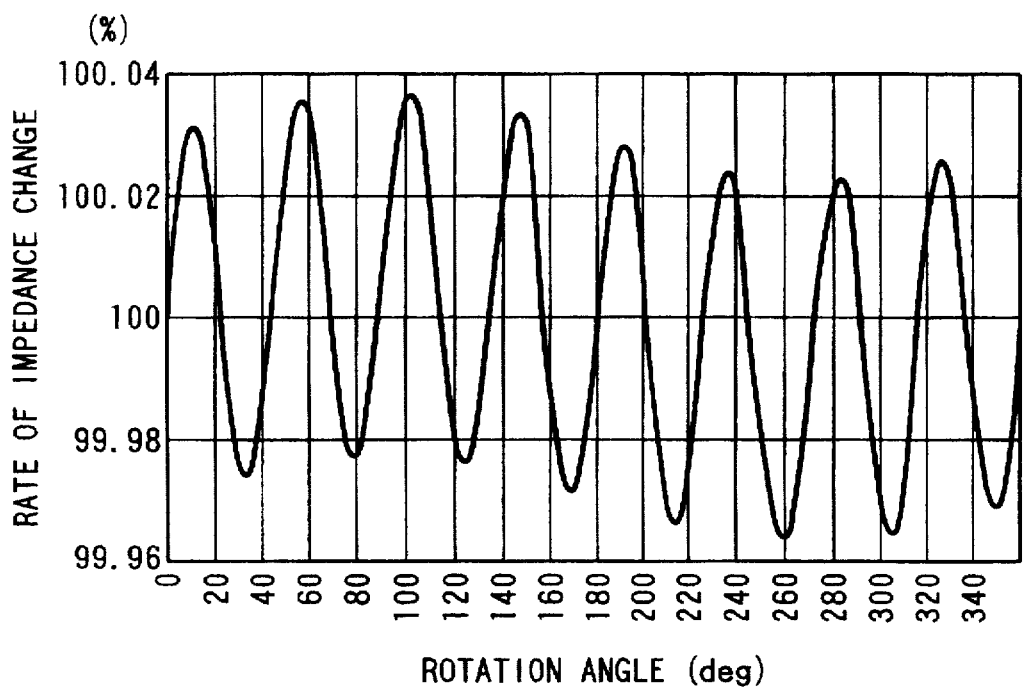
FIG. 16 is a graph showing a waveform indicating a rate of change in the impedance of one of coils of a conventional torque sensor.
Figure 17:
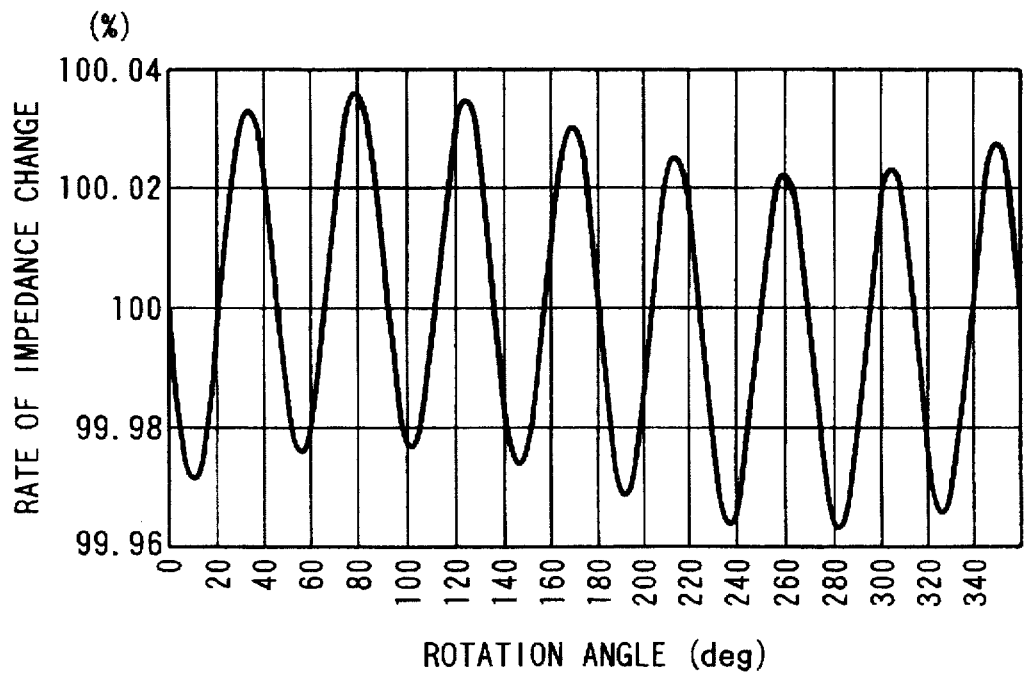
FIG. 17 is a graph showing a waveform indicating a rate of change in the impedance of another coil of a conventional torque sensor.

If the cut portion 16A is formed and the cut portions 16B and 16C are omitted similarly to the conventional torque sensor, small amplitude and low frequency (one cycle per rotation) change and large amplitude and high frequency (eight cycles per rotation) change occur in the impedance of the coil 10 as shown in FIG. 16 even if the torque is zero. Also the impedance of the coil 11 encounters small amplitude and low frequency (one cycle per rotation) change and large amplitude and high frequency (eight cycles per rotation) change as shown in FIG. 17. Since the windows 8a and the windows 8b have the phase difference of 180°, the phases of the components of the high frequency changes in the impedance of the coil 11 are shifted by 180° with respect to the high frequency component of the changes in the impedance of the coil 10.

Figure 18:
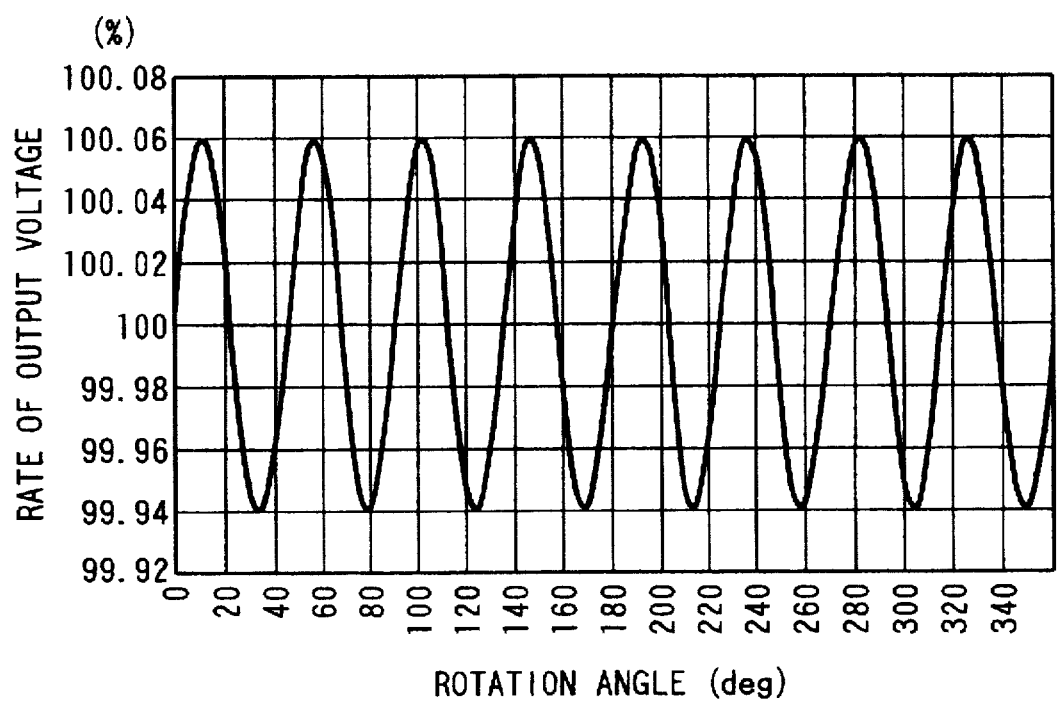
FIG. 18 is a graph showing a rate of change in the output voltage in a case where results shown in FIGS. 16 and 17 are supplied to a differential amplifier.

Therefore, even if the differential amplifiers 24A and 24B eliminate the difference, the high frequency components are undesirably amplified though the low frequency components of the changes can be set off. As a result, the output voltages from the differential amplifiers 24A and 24B are, as shown in FIG. 18, changed considerably regardless of the torque. Thus, the torque detection accuracy deteriorates and a problem arises when satisfactory steering assist torque control is performed.

In this embodiment, the input shaft 2 corresponds to the second rotating shaft, the output shaft 3 corresponds to the first rotating shaft, the portion of the output shaft 3 surrounded by the cylindrical member 8 corresponds to the surrounded portion, the cut portion 16A corresponds to the first cut portion, and the cut portions 16B and 16C correspond to the second cut portion.

The above-mentioned embodiment is structured in such a manner that when eight sets of the groove 3A and the windows 8a and 8b exist in the circumferential direction, the three cut portions 16A to 16C are formed at the same intervals in the circumferential direction so as to mutually weaken the phases of the changes in the impedance. However, the number and positions of the cut portions which are formed in the yoke members are not limited to those according to the embodiment. They may be determined arbitrarily to correspond to the number of the structure sets of the groove 3A and the windows 8a and 8b for changing the impedance to correspond to the torque. In brief, the cut portions are formed to be capable of mutually reducing changes in the impedance occurring due to the cut portions for drawing the ends of the coils 10 and 11 to the outside of the yoke members and changes in the impedance occurring due the other cut portions.

Although the description has been performed about the structure in which the torque sensor according to the present invention is applied to the electric power steering apparatus for a vehicle, the present invention is not limited to this. The structure according to the present invention may be applied to a torque sensor for another purpose.

As described above, according to the second embodiment of the present invention in which the yoke member is provided with a first cut portion for drawing the end of the coil to the outside and two or more cut portions different from the first cut portion so that change in the impedance of the coil occurring due to irregularity of the magnetic field in the coil caused by the first cut portion and change in the impedance of the coil occurring due to irregularity of the magnetic field in the coil caused by the second cut portion are mutually reduced, an effect can be obtained in that accurate torque detection can be performed.

What is claimed is:

1. A torque sensor comprising:

first and second rotating shafts disposed coaxially and connected to each other through a torsion bar;

a cylindrical member made of a conductive and non-magnetic material and integrated with said second rotating shaft in a direction of rotation to surround an outer surface of said first rotating shaft;

at least a surrounded portion of said first rotating shaft surrounded by said cylindrical portion and made of a magnetic material;

a groove formed in said surrounded portion and extending in an axial direction;

a window formed in said cylindrical member in such a manner that a state of superimposition on said groove is changed in accordance with a relative rotational position with respect to said first rotating shaft;

a coil disposed to surround a portion of said cylindrical member where said window is formed so that torque generated in said first and second rotating shafts is detected in accordance with change in the impedance of said coil; and a yoke member covering said coil;

wherein said yoke member is provided with a first cut portion for drawing an end of said coil to the outside of said yoke member and at least one second cut portion distinct from said first cut portion so that change in impedance of said coil occurring due to irregularity of a magnetic field in said coil caused by said first cut portion, and change in impedance of said coil occurring due to irregularity of the magnetic field in said coil caused by said second cut portion, are mutually reduced.

2. A torque sensor as claimed in claim 1, wherein said yoke member is composed of a first annular member for covering an outer surface and one of end surfaces of said coil and having an L-shape cross section, and a second annular member for covering another end surface of said coil and having a rectangular cross section, said first annular member covering also an outer surface of said second annular member, and being provided with said first and second cut portions having same dimensions and formed at same intervals in a circumferential direction.

3. A torque sensor as claimed in claim 1, further comprising a coil bobbin secured to said housing to be coaxial with said rotating shaft; wherein two grooves are formed in said coil bobbin to be apart from each other in an axial direction and coaxial with said rotating shaft, and said coil is wound along each of said two grooves.

4. A torque sensor as claimed in claim 3, wherein said coil bobbin comprises:

two cylindrical portions formed apart from each other in the axial direction through a gap and having the same dimensions;

outer flanges formed at outer ends of said cylindrical portions facing outside;

inner flanges formed at inner ends of said cylindrical portions opposite to each other;

connecting portions formed into a recessed shape projecting outwards in the radial direction to cross the gap, said inner flanges being connected to each other through said connecting portions;

a terminal mounting portion formed on an end surface of one of said connecting portions facing outside in the radial direction; and first, second and third metal terminals secured to an upper surface of said terminal mounting portion, an end of one of said coils being wound around said first terminal, an end of the other of said coils being wound around said second terminal, and the other ends of each of said two coils being wound around said third terminal.

* * * * *